Dec. 13, 1932.  W. F. DEHUFF  1,890,500

EQUALIZING TENSION DEVICE FOR VARIABLE SPEED DRIVES

Filed Aug. 6, 1930　　4 Sheets-Sheet 1

Inventor
Walter F. Dehuff.
By Mason Fenwick Lawrence
Attorneys

Dec. 13, 1932. W. F. DEHUFF 1,890,500
EQUALIZING TENSION DEVICE FOR VARIABLE SPEED DRIVES
Filed Aug. 6, 1930 4 Sheets-Sheet 2
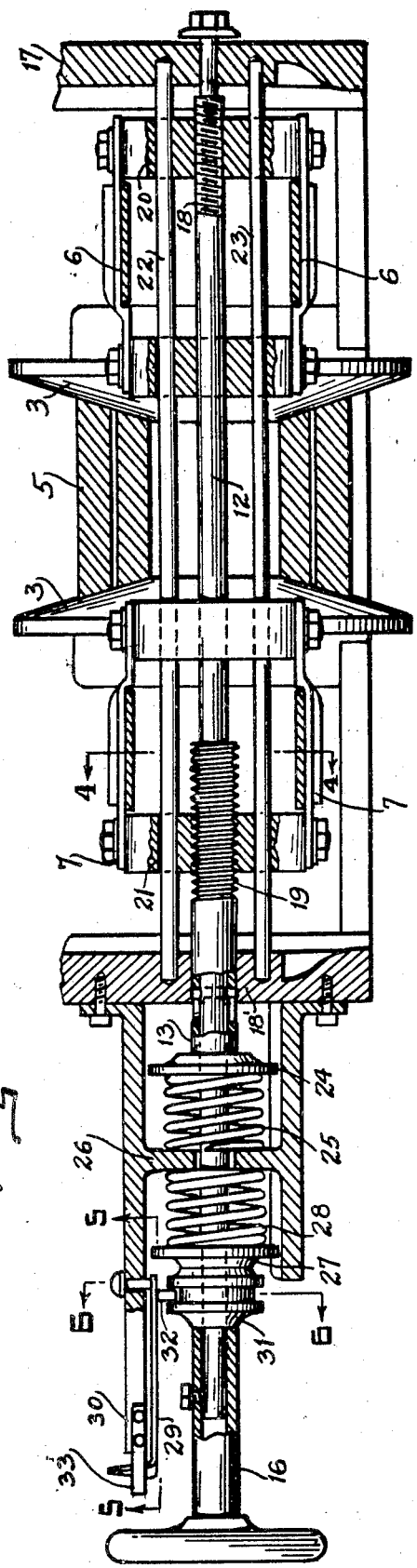
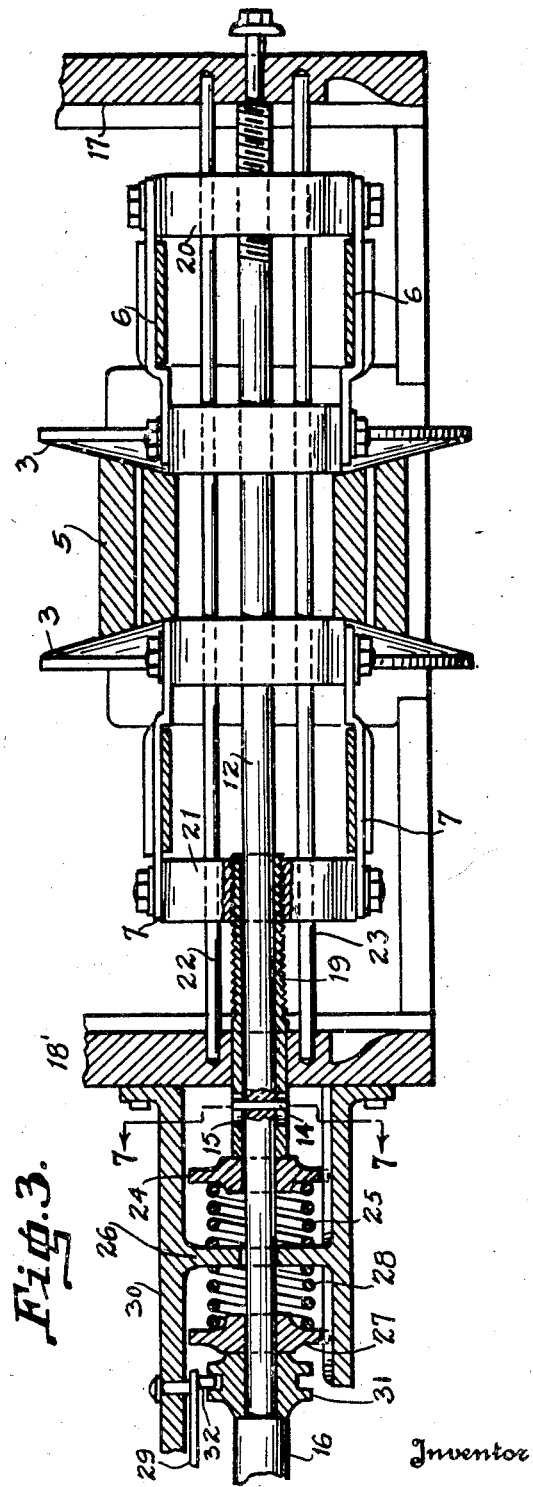
Inventor
Walter F. Dehuff
By Mason Fenwick & Lawrence
Attorneys Dec. 13, 1932.    W. F. DEHUFF    1,890,500
EQUALIZING TENSION DEVICE FOR VARIABLE SPEED DRIVES
Filed Aug. 6, 1930    4 Sheets-Sheet 3
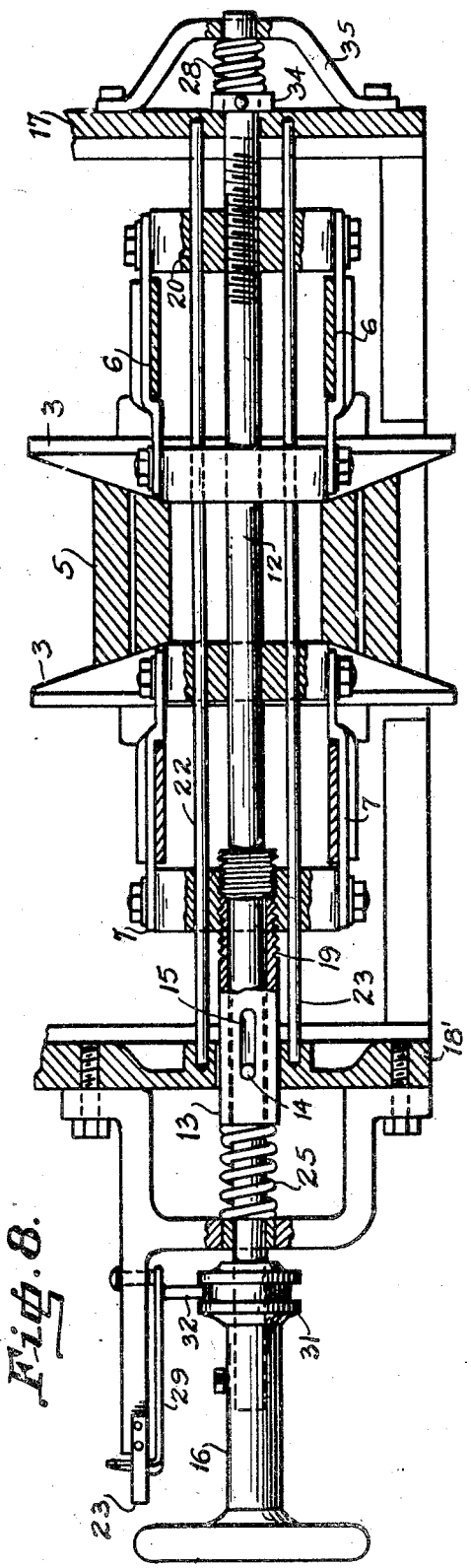
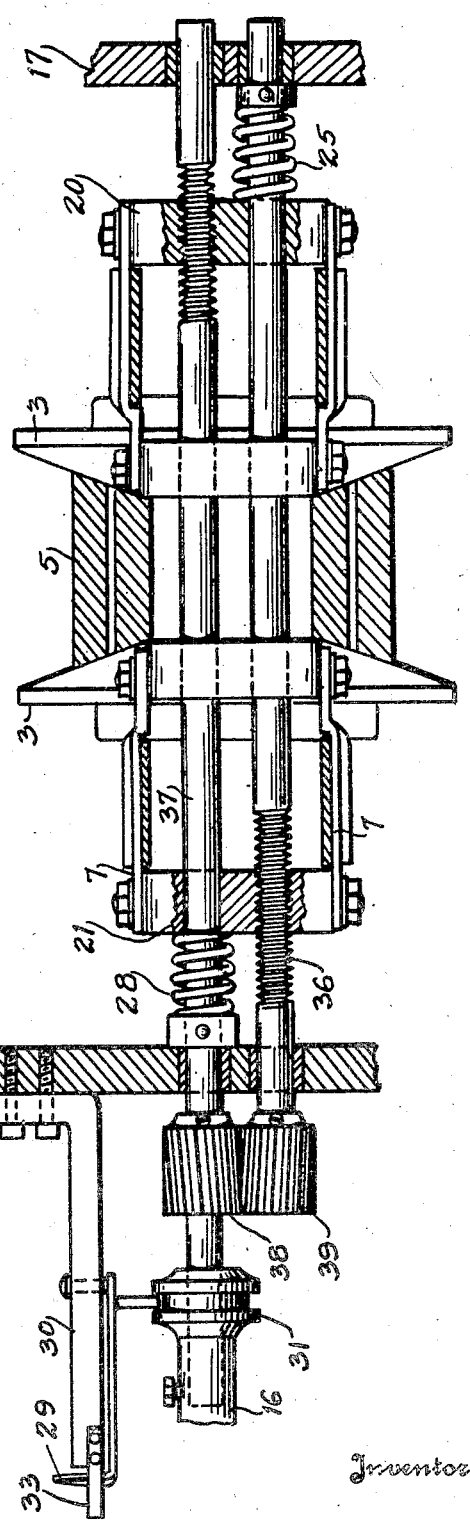
Inventor
Walter F. Dehuff
By Mason Fenwick Lawrence
Attorney

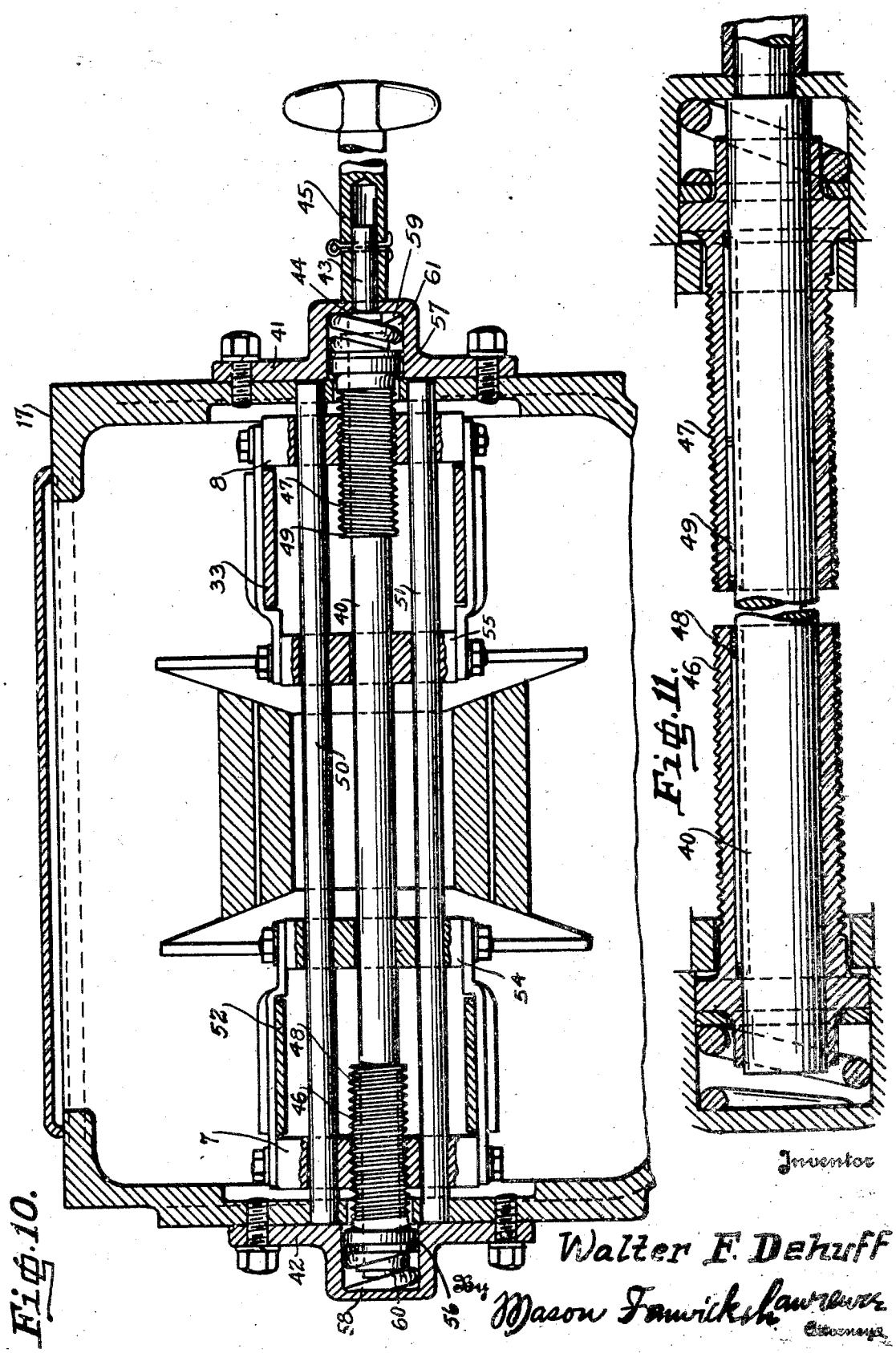

Patented Dec. 13, 1932

1,890,500

UNITED STATES PATENT OFFICE

WALTER F. DEHUFF, OF GLEN ROCK, PENNSYLVANIA

EQUALIZING TENSION DEVICE FOR VARIABLE SPEED DRIVES

Application filed August 6, 1930. Serial No. 473,493.

This invention relates to equalizing tension devices for variable speed drives and in particular, variable speed drives of the belt gearing type. Such drives are well known in the art and usually consist of conical pulleys or their equivalent arranged in spaced pairs of approachable parts about which a belt or equivalent endless gearing revolves, the pairs of pulleys being so co-ordinated that when the diameter of the driving pair is expanded by the relative approach of the parts of said pair, the diameter of the driven pair is correspondingly contracted by relative recession of its parts, whereby the speed ratio is varied.

From time to time, due to the nature of the imposed load or stretching of the belt gearing incidental to its use, it becomes necessary to tighten the belt. This is usually accomplished by positive mechanical means constructed to cause parts of both pairs of pulleys to come towards one another thus expanding the diameters of both pulleys and stretching the belt. There is a correct tension for every belt, which correct tension may vary according to the load which the belt must carry. The best instructions that can be given to the operator of a variable speed drive is that the adjustment for tension should be so made as to be just tight enough to enable the belt gearing to drive the heaviest load without slippage and that for lighter loads the tension can be profitably diminished with saving of power and a lessening on the wear and tear of the belt gearing. However, there are no two men who will make this adjustment for tension exactly as it should be. Out of one hundred men, possibly 75% will have the belt gearing too tight to start off with and the other 25%, if they do not have it too tight when they start off, will end up in many adjustments by having it too tight. The result is that the belt gearing in variable speed devices of the type indicated have an unduly short life, and frequently stretch and break necessitating stoppage of the machine, expensive repairs, and frequently, bring the variable speed drive itself into disrepute.

The present invention has for its object the provision of a tension equalizing device or stabilizer which will be entirely independent of the operator's judgment as to what is "tight". The invention can be realized in at least two forms, in one of which the degree of tension is indicated so that any desired value of tension can always be produced and maintained. In the other form a limit is set to the tension which can be applied to the belt gearing so that the maximum stress to which the belt gearing can be subjected may if desired, be determined at the factory where the drive or the tensioning device therefor is built.

Other objects of the invention will appear as the following description of several physical embodiments thereof proceeds.

In the drawings:

Figure 2 is an enlarged vertical section taken along the line 2—2 of Figure 1, the parts being shown in relative untensioned position;

Figure 3 is a similar view, the parts being shown under strong tension;

Figure 8 is a longitudinal section through another modification of the invention;

Figure 9 is a similar view of still a third modification; and

Figure 10 is a longitudinal section through a further modification, which in view of its simplicity is probably to be preferred.

Figure 11 is an enlarged view of the tightening rod of Figure 1 and adjacent parts.

Figure 1:
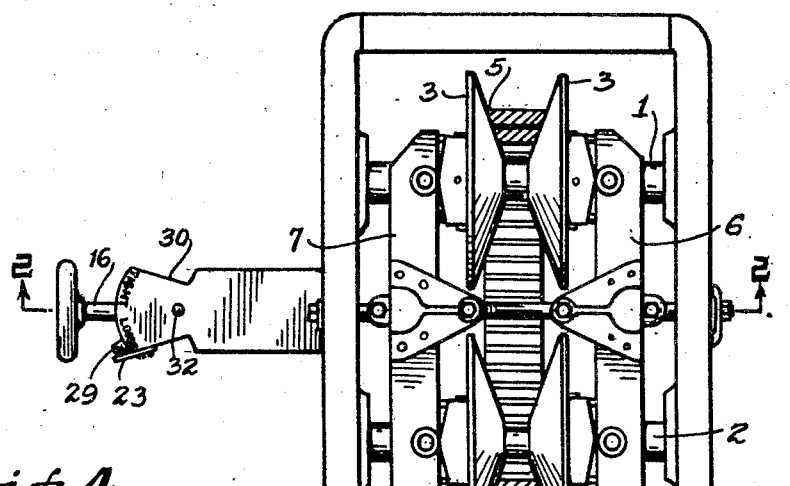
Figure 1 is a plan view of a variable speed drive embracing one form of the invention.
Figure 4:
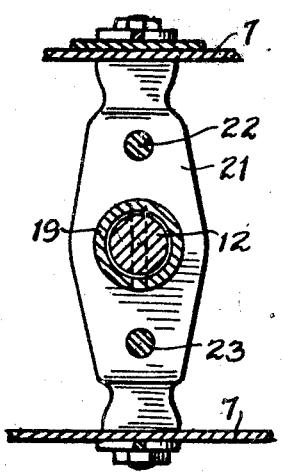
Figure 4 is a section taken along the line 4—4 of Figure 2 showing one of the travelling nuts.
Figure 5:
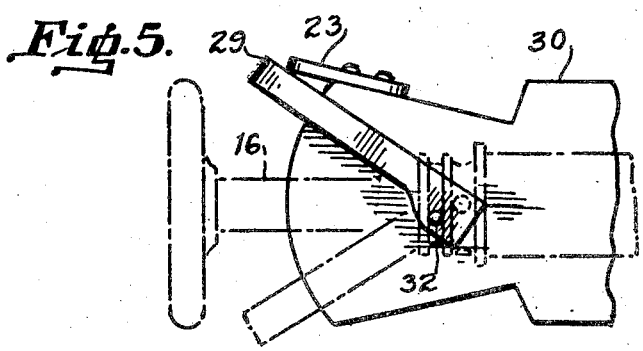
Figure 5 is a section taken along the line 5—5 of Figure 2 showing the tension indicator and limit stop.
Figure 7:
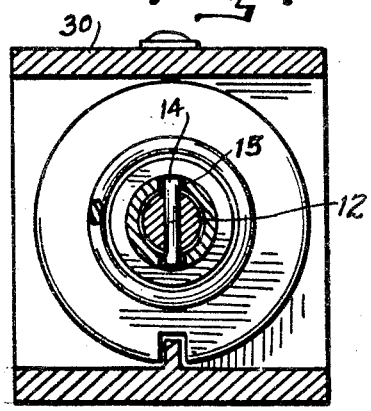
Figure 7 is a section taken along the line 7—7 of Figure 3.
Figure 6:
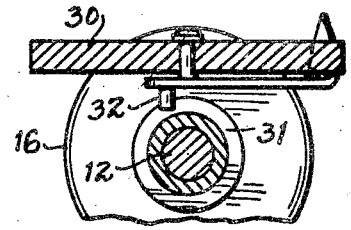
Figure 6 is a section taken along the line 6—6 of Figure 2.

Referring now in detail to the several figures, and first advertising to that form of the invention shown in Figures 1 to 7 inclusive, the variable speed drive in connection with which the invention is illustrated will be recognized at once by one skilled in the art as being the well known Reeves drive, in which there is a driving shaft 1 and a driven shaft 2 upon which are splinably supported the respective pairs of pulleys 3 and 4, each pair consisting of complementary conical parts which together form a wedge-shaped groove in which seats an endless belt 5 preferably of the sectional type as shown.

The pulleys are co-ordinated by means of bars 6 and 7 each being compositely constructed in such a manner that when the ends 8 and 9 of said bars are brought together or caused to recede by means of the actuating screw 10 and hand wheel 11, or their equivalent, the pulley parts of one pair will be brought toward one another while the pulley parts of the other pair simultaneously recede from one another causing the belt to ride out from the axis of one pair and simultaneously move in toward the axis of the other pair, thereby changing the speed ratio between the driving and driven members.

For tightening a variable drive of this type, there would ordinarily be a screw passing transversely through the drive and having a right and a left hand thread screwing directly or indirectly into bars 6 and 7 at an intermediate point, so that when a wrench is applied to an end of the screw, the bars may be brought simultaneously toward one another, bringing the pulley parts of both pairs slightly together and thus spreading or tensioning the belt. It is obvious as has been suggested in a prefatory paragraph that one man may have a heavier hand on the wrench then another so that with such an inflexible tensioning means the belt may be injuriously stretched.

The present invention substitutes for the single screw above described, a two part member consisting of a rod 12 and a sleeve 13, the latter telescoping over the rod and having a limited freedom for reciprocation by means of the pin 14 and slot 15 shown in Figure 3. The pin 14 connects the rod and sleeve rotatably together. The rod extends to a convenient distance outside of the drive and terminates in an operating knob or lever 16.

It will be noted in Figure 2 that the rod is slidably journalled in one side of the frame 17 of the variable drive while the sleeve is slidably journalled in the other side 18'. The end of the rod which lies adjacent the side 17 is provided with a right hand screw thread 18 while the end of the sleeve adjacent the side 18' is provided with a left hand screw thread 19. Travelling nuts 20 and 21 are mounted on the respective screw threads and one skilled in the art will know that these nuts are similar in position and function to the nuts in the Reeves drive and that they are connected to the bars 6 and 7, which control the movements of the pulley parts, and transmit lateral movement to said bars. The nuts 20 and 21 are maintained in upright position by sliding along guides 22 and 23.

It will be apparent from Figures 2 and 3 that when the knob or handle 16 is turned in a tightening direction, both nuts will travel along their respective right and left hand threads toward one another until the pulley parts of each pair of pulleys come into firm engagement with the faces of the belt 5. When the nuts have reached this point they can freely move no further, and consequently, further rotation of the handle 16 in a tightening direction causes the rod and sleeve, at the same time they are rotating together, to travel longitudinally away from each other, that is to say, in opposite directions. It will be noted from Figures 2 and 3 that the sleeve has an abutment washer 24 and that a spring 25 is confined between said washer and a fixed partition 26. When the sleeve travels leftward it compresses the spring 25 and by reaction transmits the compression pressure back through the nut 21, bars 7 and the adjacent pulley parts, to the belt 5.

It will be noted that the rod 12 has an abutment washer 27 and that a spring 28 is confined between said abutment washer and the partition 26. When the rod 12 moves rightward, the spring 28 is compressed and the pressure is transmitted reactively against the nut 20, through the bars 6, the pulley parts, and to the side of the belt 5. It will thus be seen that after the nuts 20 and 21 have become stationary relatively to the rod and sleeve due to the firm engagement of the pulley parts with the sides of the belt, the sleeve and rod then travel oppositely, compressing the springs 25 and 28 and imposing the yielding pressure of said springs upon the sides of said belt. The springs are selected so as to be of substantially the same strength, consequently, the yielding pressure is substantially the same on both sides of the belt and therefore, the belt is not shifted laterally in either direction but remains centered with respect to the frame and the other elements of the drive.

A tension gage is fitted to that form of the invention shown in Figures 1, 2 and 3, comprising a pointer 29, pivotally mounted and movable relative to a scale plate 30. The sleeve 13 has a grooved collar 31 and the pointer is provided with a pin 32 eccentric with respect to the pivotal connection of said pointer, extending into the groove of the collar. By virtue of this construction when the sleeve moves outwardly it rocks the pin 32 about the pivotal axis of the pointer imparting angular movement to the pointer. The scale is preferably marked with tension values and the handle 16 may be turned until the pointer has reached any desired tension value indicated on the scale. Thus, the degree of tension to be imparted to the belt is no longer left to guess work or "feel", but is positively indicated and determined by the pointer and scale.

It is to be understood that the drawings illustrating this invention are derived from an inventor's model and not necessarily from a commercial embodiment of the device, so that the details of construction are to be considered merely as illustrative and not as representing any final form in which the invention will be embodied.

In place of or in addition to the tension indicating means, a positive stop may be provided for determining the maximum tension which can be impressed upon the belt gearing. Figure 2 suggests such a stop, in the lug 33 secured to a side of the scale plate and with the pointer it engages. It is to be understood however, that the stop could be as well or even more advantageously placed at any other desired part of the mechanism.

In that form of the invention shown in Figure 8, the essential elements vary but little from those shown in Figures 1, 2 and 3, the main difference being that the springs are now separated, one being placed at each side of the frame. The spring 25 which reacts through the sleeve when the latter moves outwardly remains in position substantially unchanged, while the spring 28 which reacts against the outward thrust of the rod 12, is maintained confined between a fixed collar 34 on the rod 12 and a bracket 35 secured to the outside of the frame member 17.

The modification shown in Figure 9 distinguishes from those that have been previously described in that the sleeve and rod unit has been substituted by a pair of rods 36 and 37 geared together by gears 38 and 39. It is obvious from this gear connection that the rods will rotate in opposite directions. Both rods are slidably mounted in bearings in the sides 17 and 18' of the frame and the gears 38 and 39 are made of such width that they will still be in mesh throughout the range of sliding movement of said rods. The rod 37 has a right hand thread on which travels the nut 20 while the rod 36 has a right hand thread traversed by the nut 21. The action in this modification is the same as in the previous forms. Upon rotation of the rod 37 by means of the handle 16, the rod 36 will also rotate and the nuts 20 and 21 will move together until the pulley parts abut the sides of the belt. Then the rod 37 will move rightward against the tension of the spring 28 while the rod 36 will move leftward against the tension of the spring 25. Thus the tension of these springs will react through their respective nuts and pulley parts imposing a definite yielding pressure against the sides of the belt determined by the extent to which the springs are compressed as indicated by the scale and pointer, or as determined by the limit stop 33. By virtue of this yielding pressure, the effective diameters of both pulleys are increased and the belt correspondingly tensioned.

In that form of the invention shown in Figures 10 and 11, a single shaft 40 is journaled in the side frame members 18' and 17, the ends of said shaft being preferably extended beyond said frame members and housed in socketed cap members 41 and 42, secured to the respective frame members. One end 43 of said shaft is reduced so as to project through the end wall of the adjacent cap member, forming a shoulder 44 which abuts against the inner wall of said cap member. A handle 45 suitably secured to the projecting end of said shaft abuts against the outer wall of said cap member and thus the shaft is prevented from moving longitudinally.

Oppositely threaded sleeves 46 and 47 are slidably and rotatably arranged on the shaft 40 adjacent its opposite ends, by means of splines 48 and 49. Nuts 7 and 8 engage the threads on said sleeves, said nuts being held in up-right position by rods 50 and 51 passing through apertures in said nuts and on which the nuts are slidably mounted. The nuts 7 and 8 carry the usual bars 52 and 53 on which the pulley parts of both the driving and driven members are mounted. The edges of said bars remote from the nuts 7 and 8 are supported by followers 54 and 55, which also slide upon the rods 50 and 51. The followers represent a mechanical detail which does not particularly concern the present invention, except in its most specific construction.

The threaded sleeves 46 and 47 project into the socketed caps 41 and 42, said sleeve being provided with enlargements forming flanges 56 and 57 serving as abutments for the tensioning springs 58 and 59 which are housed in said socketed caps.

In operation, when the shaft 40 is rotated by means of the handle 45, the sleeves 48 and 49 at first rotate with said shaft and the nuts move longitudinally inward along both sleeves pressing the bars 52 and 53 and the pulley halves into contact with the sides of the belt When the pulley halves have made firm contact with the belt, they become momentarily stationary with respect to the sleeves 48 and 49, and then the latter reacting against said nuts begin to move outward compressing the springs 58 and 59 and transmitting the resilient pressure of said springs through said nuts and said bars, to the pulley halves. The sleeves 48 and 49 have the outer ends 60 and 61 thereof extending into said springs and spaced a distance from the end walls of the socketed caps in which they are housed. When the sleeves have screwed outwardly until the ends thereof come in contact with the adjacent end walls of the socketed caps, said sleeves can move no further and consequently, further pressure applied to the handle 45 is ineffective in transmitting any further tensioning pressure to the tensioning device.

As in other modifications of the invention, the springs 58 and 59 are preferably of equal tension so as to maintain the centering of the pulley halves and of the belt.

It is obvious that the illustrated forms of the invention are only suggestive of a great many structural variations in which the principles of the invention can be reduced to practice and the details of construction as shown are therefore, to be considered as exemplary only and not in any sense as limitative in their bearing upon the scope of the invention as claimed, either as regards the structure of the tensioning mechanism per se, or the particular type of drive with which it may be combined.

What I claim is:

1. In a variable speed drive including driving and driven pulleys each comprising mutually approachable parts and connected by belt gearing, means for bringing said parts adjustably together to increase the radius of the circumferential portion of the path of travel of said belt gearing for tensioning the latter comprising actuating members adapted to be extraneously rotated for making the tensioning adjustment, operatively connected to said pulley parts for moving them into tensioning relation to said belt gearing said members being connected to rotate together but relatively reciprocable, means forming part of the operative connection between said members and pulley parts and imparting reciprocable movement in opposite directions to said members when the applied force continues beyond the point where the last named means becomes stationary relative to said actuating means, and spring means resisting the reciprocatory movement of said members for transmitting yielding pressure to said pulley parts.

2. Variable speed drive as claimed in claim 1, the spring means including springs being of substantially equal tension for maintaining the centering of said belt gearing.

3. Variable speed drive as claimed in claim 1, including a stop in the mechanical line of force transmission in said tensioning mechanism for limiting the maximum tensioning pressure which can be applied to said belt gearing.

4. In variable speed drive including driving and driven pulleys each comprising mutually approachable parts and connected by belt gearing, means for bringing said parts adjustably together to increase the radius of the circumferential portion of the path of travel of said belt gearing for tensioning the latter, comprising tensioning members rotatable together but relatively reciprocable, said members being threaded, nuts travelling simultaneously in opposite directions on said threaded members and movable with said pulley parts for bringing the latter together against the belt gearing, said members thrusting against the respective nuts so as themselves to move reciprocably in opposite directions, when the applied force is continued beyond the point where said nuts become stationary relative to said thrust members, and spring means resisting the reciprocatory movement of said members for transmitting yielding pressure to said pulley parts.

5. In variable speed drive including driving and driven pulleys each comprising mutually approachable parts and connected by belt gearing, means for bringing said parts adjustably together to increase the radius of the circumferential portion of the path of travel of said belt gearing for tensioning the latter, comprising tensioning members rotatable together but relatively reciprocable, said members being threaded, nuts travelling simultaneously in opposite directions on said threaded members and movable with said pulley parts for bringing the latter together against the belt gearing, said members thrusting against the respective nuts so as themselves to move reciprocably in opposite directions, when the applied force is continued beyond the point where said nuts become stationary relative to said thrust members, and springs of substantially equal tension resisting the reciprocatory movement of said respective members for transmitting yielding pressure to said pulley parts.

6. In a variable speed drive including driving and driven pulleys each comprising mutually approachable parts and connected by belt gearing, means for bringing said parts adjustably together to increase the radius of the circumferential portion of the path of travel of said belt gearing for tensioning the latter, comprising a sectional coaxial tensioning member including a rod, and a sleeve telescoping over a portion of said rod, said rod and sleeve being connected for unitary rotation, but for relative reciprocation, and reversely threaded, nuts travelling on said threaded portions of said sleeve and rod and movable with said pulley parts for bringing the latter together against said belt gearing, said rod and sleeve thrusting against said nuts when the applied force is continued beyond the points where said nuts becomes stationary relative to said rod and sleeve, respectively, the latter elements themselves moving reciprocably in opposite directions, and springs resisting the reciprocatory movement of said sleeve and rod, for transmitting yielding pressure through said nuts to said pulley parts.

7. In a variable speed drive including driving and driven pulleys each comprising mutually approachable parts and connected by belt gearing, means for bringing said parts adjustably together to increase the radius of the circumferential portion of the path of travel of said belt gearing for tensioning the latter, comprising a frame, a shaft rotatable in said frame to which tensioning pressure may be applied, reversely threaded sleeves splined on said shaft adjacent the opposite sides of said frame, nuts threaded on said sleeves, and operatively connected with said pulley parts for bringing the latter together against said belt gearing, said sleeves thrusting against said nuts when the applied force is continued beyond the points where the nuts become stationary relative to said sleeves, the latter moving reciprocably in opposite directions, and springs resisting the reciprocatory movement of said sleeves for transmitting yielding pressure through said nuts to said pulley parts.

8. In variable speed drive as claimed in claim 7, including socketed caps secured to said frame members into which the ends of said sleeves project, abutments on said sleeves, said springs being confined between the end walls of said caps and said abutments.

9. A variable speed drive including complementary pulley members, one of which is movable laterally toward and from the other, a driving screw, a nut on said screw, connections between said nut and movable pulley member, a resilient member against which said screw reacts, and means for limiting the movement of the screw against the resilient member.

10. A variable speed drive including complementary pulley members, each movable laterally toward and from the other, telescoping driving screws for the respective members, nuts on said screws connected respectively with said pulley members, the screws being operatively arranged to drive the nuts in opposite directions, and resilient means against which the screws react.

In testimony whereof I affix my signature.

WALTER F. DEHUFF.